March 18, 1958 F. MEYERCORDT 2,827,143
SAFETY STOPS FOR POWER PRESSES AND LIKE MACHINES
Filed March 21, 1955 2 Sheets-Sheet 1

INVENTOR
FRITZ MEYERCORDT
BY
AGT.

March 18, 1958 F. MEYERCORDT 2,827,143
SAFETY STOPS FOR POWER PRESSES AND LIKE MACHINES
Filed March 21, 1955 2 Sheets-Sheet 2

INVENTOR
FRITZ MEYERCORDT
BY
AGT.

United States Patent Office 2,827,143
Patented Mar. 18, 1958

2,827,143

SAFETY STOPS FOR POWER PRESSES AND LIKE MACHINES

Fritz Meyercordt, Goppingen, Wurttemberg, Germany, assignor to L. Schuler A. G., Goppingen, Wurttemberg, Germany Application March 21, 1955, Serial No. 495,734

Claims priority, application Germany March 31, 1954

19 Claims. (Cl. 192—150)

This invention relates to power stops for power presses and like power-driven machines, and more particularly to means for automatically and rapidly stopping a press or like machine at a predetermined maximum load.

It is an object of the present invention to provide means facilitating automatic control of operation of power presses and like machines in a highly efficacious manner to avoid subjecting such presses and machines to loads exceeding a predetermined maximum value, whereby safe operating conditions are enhanced both for the machine and operators thereof.

It is another object of the present invention to provide means contributing to a novel and improved automatic load-limiting power control for presses and like machines, said control being designed for extremely high-speed response to maximum permissible loads and stresses to which said presses and machines may be subjected so as to reduce to a minimum the time interval which may elapse between attainment of said maximum stresses and stopping of the machines.

Another object of the present invention is to provide means ensuring substantially immediate interruption of the operation of a power press and like machine upon application thereto of loads higher than the maximum load for which such press or machine was designed, and further ensuring retention of said press or machine in inoperative condition pending removal of said higher load therefrom.

Still another object of the present invention is to provide means conducive to greatly simplified, yet highly efficient overload safety devices for presses and like machines, in which the force of an explosion is employed in combination with a fluid-actuated mechanism for disconnecting the power source from the operating elements of the presses or machines in such a manner as to substantially accelerate the action of such mechanism in response to overloading of said presses or machines.

A further object of the present invention is to provide means redounding to compact and effective auxiliary devices for aiding in disengagement of fluid-operated power transmission clutches of presses and like machines, which devices may be inexpensively manufactured and easily installed on all machines employing such fluid-operated clutches.

More particularly, the invention relates to means for automatically and rapidly disconnecting or cutting off a power press or like machine from the drive or load applying means, especially where the load is transmitted to the ram or other operating element of such press or machine through a fluid pressure-operated clutch or coupling.

There are generally known electro-pneumatic clutch devices in which compressed air is permitted to escape, upon attainment of the maximum desired working load, to deactuate the clutch and thereby the machine. Heretofore the control valves for such devices have been electromagnetically actuated, the electromagnetic actuating means being energized through closing of electric contacts in response to the load on the press or machine. However, the building up of the magnetic field of said actuating means for the control valve requires a certain amount of time as does also the escape of the pressurized fluid, such as compressed air, subsequent to operation of the valve.

It is, therefore, a further object of the present invention to overcome and obviate the above-mentioned disadvantages, especially if the power or drive means of the machine is of the flywheel type. This object is fulfilled in that, besides the usual control valve for the fluid pressure medium serving to hold the clutch or coupling engaged or closed, that is provided a separate exhaust valve presenting an exhaust passageway of relatively large cross-section, said exhaust valve being attached to a chamber in which the pressure medium for holding the clutch or coupling closed is contained. Additionally, there are provided means for opening this exhaust valve as soon as the press or machine is subjected to the maximum permissible load.

Preferably, the auxiliary exhaust valve is actuated simultaneously with the conventional clutch control valve. The disconnection between the drive means and the operating element of the machine takes place even more rapidly than usual, the escape of the fluid pressure medium being enhanced not only by provision of an escape path of relatively large cross-section but also by the provision of means ensuring opening of the auxiliary valve which provides said path of large cross-section in the most rapid manner possible. As a further refinement of the invention, therefore, the means for opening the auxiliary valve are so constructed as to function practically instantaneously by virtue of employing a large supply of energy stored in an easily releasable form.

The rapid and nearly instantaneous opening of the auxiliary valve may be accomplished with simple, inexpensive means occupying a minimum of space by employing a detonator so connected with said auxiliary exhaust valve that the latter is opened by means of an explosion caused by ignition of the charge in the detonator. To this end, means are provided to effect such ignition when the load on the press or machine reaches its maximum permissible value. Ignition of the detonator charge can be accomplished electrically, as by a spark, or mechanically as, for example, by release of a firing pin.

The invention will be more fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therein as do not affect the spirit of the invention nor exceed the scope thereof as expressed in the appended claims.

Figure 1:
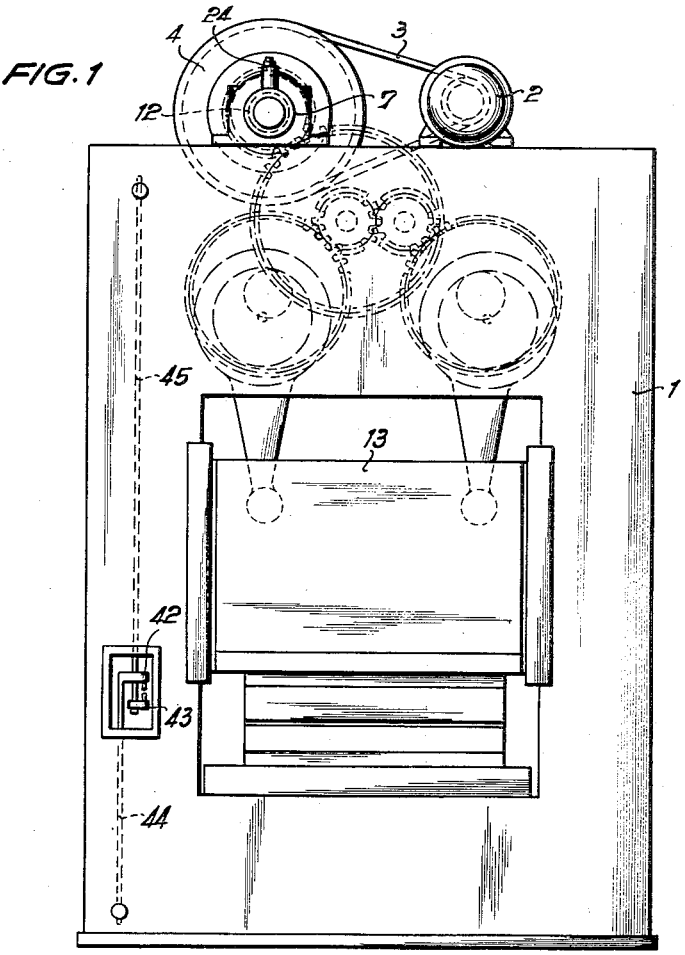
Fig. 1 is a schematic front elevational view of a power press incorporating the power cut-off or stop according to the present invention.
Figure 2:
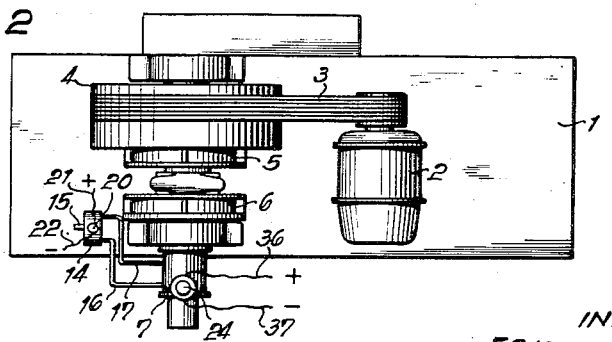
Fig. 2 is a top plan view of the press of Fig. 1.

Referring now more particularly to the drawings, there is shown in Fig. 1 a power press having a frame 1 to which is affixed an electric drive motor 2 which drives a flywheel 4 by means of V-belts 3. Disposed coaxially with flywheel 4 are a compressed air-actuated clutch 5 and a similarly actuated brake 6. Operation of the clutch and the brake is effected by means of a piston 8 reciprocating in a cylinder 7 (see Fig. 4), piston rod 9 of piston 8 transmitting the motion of piston 7 to the actuating elements of the clutch and the brake.

The clutch and brake may, for example, be of the type commonly known as disc or plate clutches and brakes which form no part of this invention and thus need not be further illustrated. Operation of the clutch and brake is aided by a spring 11 acting on an annular collar or flange 10 provided on a rearward extension of piston rod 9. The ram or other operating element 13 of the press is driven through intermediate gearing, crankshafts, or similar transmission means operatively connected to flywheel shaft 12.

Cylinder 7 is supplied with a fluid under pressure by means of a reversing control valve 14 so constructed that the pressure fluid may be fed alternately or as desired to either side of piston 8. The pressure fluid is supplied from a suitable source (not shown) to the control valve through pipe or conduit 15, and from the control valve through conduits 16 and 17 to opposite sides of piston 8 in cylinder 7. Shaft or stem 19 of the control valve is actuatable by an electromagnet 20 which may be energized through leads 21 and 22.

In the wall of cylinder 7 there is provided an escape or outflow opening or passageway 23 of relatively large cross-section which is closed by means of an auxiliary exhaust valve generally designated as 24. Valve member 25 of valve 24 is provided with two axially spaced annular collars or flanges 26 and 27 of enlarged diameter with respect to the diameter of the shaft portion of member 25. Collars 26 and 27 are slidably guided in a central bore 28 of valve housing 24' of valve 24, said collars fitting the bore in the manner of pistons. Interposed between collar 26 and inner end 29 of valve bore 28 is a valve spring 30 which biases valve member 25 upwardly as seen in Fig. 3 so as to close valve 24.

The opposite, outer end of valve bore 28 is closed by means of a plug screw 31 which is formed with a central bore 33 closed at one end by a screw 32. In bore 33 is located a detonator 34 connected to an electric ignition arrangement 35. Ignition arrangement 35, which may, for example, be a spark gap device, is energized through leads 36 and 37, of which high voltage lead 37 is connected to the arrangement through an insulator 38 while grounded lead 36 is connected to a clamp or binding post 39 threaded directly into valve housing 24'.

Figure 3:
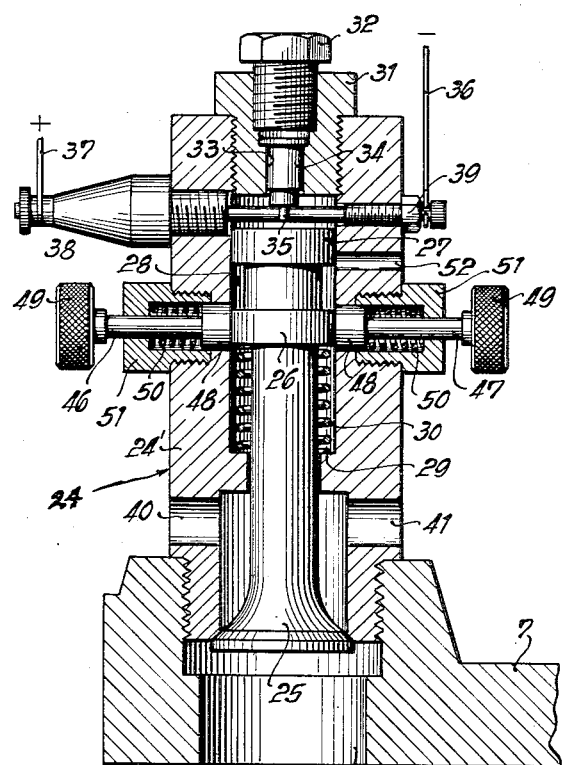
Fig. 3 is a sectional view of the auxiliary exhaust valve and detonator arrangement shown on an enlarged scale.

When the charge in detonator 34 is exploded, as by a spark created by the potential applied across leads 36 and 37, then the pressure exerted by the expanding explosion gases on piston-like collar 27 of valve member 25 forces the latter downwardly (as seen in Fig. 3) with great force and speed. This causes a substantially instantaneous opening of exhaust valve 24 to such an extent that the pressure medium in cylinder 7 is enabled to escape rapidly through passageway or channel 23 and outlet openings 40 and 41 of valve housing 24'. The explosion gases escape from housing 24' through an opening 52 disposed in the upper portion of the valve housing.

Ignition of the explosive charge is initiated by engagement of a pair of electric contacts 42 and 43 which are, respectively, connected to a pair of lever-like rods 44 and 45 constituting portions of a conventional mechanical strain gage or elongation measuring device (not shown) affixed to the frame of the press. The system may be so arranged that simultaneously with closing of contacts 42 and 43 a potential is applied across leads 21 and 22 of driving magnet 20 for reversing control valve 14.

Figure 4:
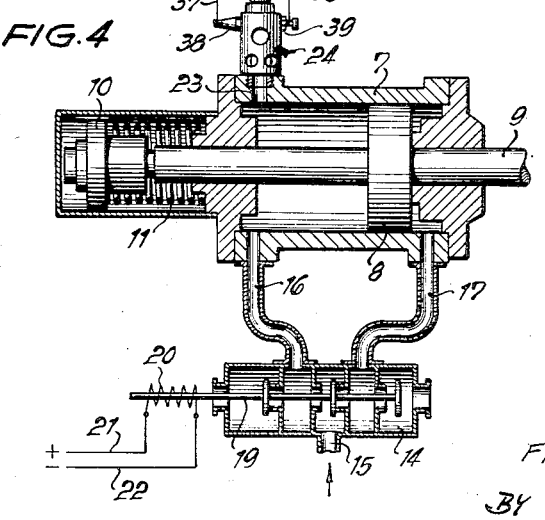
Fig. 4 is a schematic sectional view of the fluid pressure actuating means for the clutch and brake of the press, the reversing control valve and the auxiliary exhaust valve being illustrated on a scale larger than that of Figs. 1 and 2 but smaller than that of Fig. 3.

In this manner, valve 14 is reversed at the same time as exhaust valve 24 is opened by explosion of the detonator charge so that piston 8 is moved to the left as seen in Fig. 4 not only under the influence of spring 11 but also because of the pressure of the fluid admitted to cylinder 7 through conduit 17. Whereas in the usual case pressure fluid on the left side of piston 8 would escape only through conduit 16, in a construction according to the present invention such fluid is additionally permitted to escape through channel 23 and exhaust openings 40 and 41 of valve 24.

In accordance with the invention, moreover, it is contemplated that more than one strain gage may be employed with any particular press. In lieu of attaching one strain gage arrangement, such as 44, 45, to the frame of the press it is possible to employ electric strain gages attached to the connecting rods of the ram of the press and/or, in the case of double-acting drawing or extrusion presses, to the driving links for the blank holder.

In double-acting presses, in which the forces of the blank holder and the ram are added, it is preferred to employ at least one strain gage responsive to the force exerted by the ram and at least one strain gage responsive to the force exerted by the blank holder arrangement. In such a system, of course, the respective ignition contacts would be connected in series.

In double-acting presses having a four-point drive for the ram and the blank holder, a quadruple or four-fold strain gage arrangement may be provided for both the ram and the blank holder, i. e., one strain gage for each driving point. The power source will then be cut off from the press when the maximum permissible load of any one of the four driving points is exceeded, so that undesired and unpermissible canting of the ram or of the blank holder is prevented.

In accordance with the invention, means are provided to retain valve member 25 in its valve-opening position to which it was forced by explosion of the charge of detonator 34. To this end, a pair of bolts 46 and 47 are slidably disposed in housing 24' of valve 24 at right angles to the axis of said housing. The inner ends of said bolts are provided with flanges 48 and their outer ends with knurled handles or knobs 49. Bolts 46 and 47 are biased inwardly of the housing by a pair of springs 50, each of which is interposed between a respective flange 48 and the inner ends of a corresponding cap 51 surrounding said bolts and threaded into housing 24'.

Bolts 46 and 47, though biased toward the interior of the housing, are normally restrained against movement in that direction by collar 26 of valve member 25 when the latter is in its valve-closing position. However, as soon as valve member 25 is impelled to its valve-opening position by actuation of detonator 34, flanges 48 of bolts 46 and 47 are snapped into the annular groove or channel defined by collars 26 and 27 on the shaft portion of valve member 25. Consequently, once the valve is opened it will be retained in its open condition until the defect detected in the press or machine, i. e., the cause of the overload in the press or machine or any of its parts, is eliminated.

Upon insertion of a new detonator 34 in bore 33, bolts 46 and 47 may be pulled away from shaft 25 by means of knobs or handles 49 so that valve spring 30 can again return valve member 25 to its valve-closing position. The machine is then ready to be restarted. If desired, locking or latching means (not shown) may be provided in conjunction with bolts 46 and 47 to prevent withdrawal of the latter from between collars 26 and 27 until such locking means are released.

Thus it may be seen that there has been provided, in accordance with the invention, a power stop mechanism for a press and like power-driven machine having a clutch for transmitting power from drive means to an operating element of the press, comprising fluid pressure means operatively connected to said clutch and operable to selectively actuate and deactuate said clutch for operating and stopping said press, respectively, load sensing means on said press and operatively connected to said fluid pressure means, and high-speed auxiliary means operatively connected to said fluid pressure means for accelerating clutch-deactuating operation of the latter, said load sensing means being arranged to operate said fluid pressure means and said auxiliary means when said press is subjected to a load in excess of a predetermined maximum permissible load so as to deactuate said clutch and thereby to stop said press instantaneously upon the latter being subjected to said excessive load.

Having thus described the invention, what is claimed as new and desired to be secured by Letters Patent, is:

1. In an overload cut-off mechanism for a power press and like machine having an operating element, drive means for said element, and a releasable clutch interconnecting said drive means and said element; a cylinder, a piston reciprocably movable within said cylinder, a piston rod extending from said piston into and without said cylinder, said rod being operatively connected to said clutch to actuate the latter when said piston is in a first position and to deactuate said clutch when said piston is in a second position, a pair of conduits communicating with said cylinder and located on opposite sides of said piston, a reversing control valve interconnecting a source of fluid under pressure and said conduits and operable to selectively transfer fluid through the latter from said source to one side and to the other side of said piston within said cylinder, whereby said piston may be reciprocated between said first and second positions, said cylinder being provided with a passageway for escape of fluid at one side of said piston, an exhaust valve normally closing said passageway, and means responsive to stresses in said press for opening said exhaust valve and simultaneously operating said reversing control valve so as to direct fluid into said cylinder in such a manner as to move said piston to said second position and deactuate said clutch instantaneously upon creation of overload conditions in said press.

2. In a mechanism according to claim 1, said exhaust valve comprising a valve member and means acting on said valve member to bias the latter to close said passageway, said stress responsive means including detonator means disposed in said exhaust valve and provided with an explosive charge, and stress sensing means disposed on said press, said detonator means being actuatable by said stress sensing means to explode said charge, whereby said valve member is instantaneously propelled against the force of said biasing means to open said passageway.

3. In a mechanism according to claim 2, said stress sensing means comprising strain gage means operatively attached to said press and provided with a pair of opposed, normally spaced electric contacts, said detonator means including electric spark means for igniting and exploding said charge, said contacts being operatively connected to said spark means and arranged to engage one another only upon creation of overload conditions in said press, to thereby energize said spark means to ignite said charge.

4. A safety mechanism for a power press and like machine, comprising a cylinder, a piston reciprocably movable within said cylinder, said piston being operatively connected to said press to actuate the latter when said piston is in a first position and to deactuate said press when said piston is in a second position, means communicating with said cylinder for selectively feeding fluid under pressure from a source of fluid to one side and to the other side of said piston within said cylinder, whereby said piston may be reciprocated between said first and second positions, said cylinder being provided with a channel for escape of fluid at one side of said piston, an auxiliary valve normally closing said channel, and strain gage means responsive to stresses in said press and operable, when said press is subjected to a load in excess of a predetermined maximum load, to open said auxiliary valve and to simultaneously actuate said fluid feeding means so as to direct fluid into said cylinder in such a manner as to substantially instantaneously move said piston from said first position to said second position, whereby said press is instantaneously stopped upon being subjected to said excess load.

5. A power stop mechanism for a press and like power-driven machine having a clutch for transmitting power from drive means to an operating element of the press; comprising fluid pressure means operatively connected to said clutch and operable to selectively actuate and deactuate said clutch for operating and stopping said press, respectively, load sensing means on said press and operatively connected to said fluid pressure means, and high-speed auxiliary means operatively connected to said fluid pressure means for accelerating clutch-deactuating operation of the latter, said load sensing means being arranged to operate said fluid pressure means and said auxiliary means when said press is subjected to a load in excess of a predetermined maximum permissible load so as to deactuate said clutch and thereby to stop said press instantaneously when said press is being subjected to said excessive load said fluid pressure means including a channel providing an escape path for fluid from said fluid pressure means, said auxiliary means comprising a valve normally closing said channel and being provided with means for storing energy in an easily releasable form, said load sensing means being operable to release said energy for opening said valve substantially instantaneously, whereby rapid escape of fluid from said fluid pressure means through said channel is facilitated and said clutch-deactuating operation is correspondingly accelerated.

6. A mechanism according to claim 5, said valve including resilient means for normally retaining said valve in closed condition, said energy storing means comprising detonator means provided with an explosive charge, said load sensing means being operable to explode said charge and thereby force said valve open against the force of said resilient means.

7. A mechanism according to claim 6, said load sensing means comprising strain gage means, said mechanism further including means actuated by said strain gage means for creating an electric spark to actuate said detonator means and ignite said explosive charge when said predetermined maximum load is exceeded.

8. A mechanism according to claim 6, said valve being further provided with releasable means for retaining said valve in said open condition subsequent to said explosion of said charge, whereby restarting of said machine is prevented pending release of said releasable means.

9. A mechanism according to claim 6, said load sensing means comprising strain gage means, said mechanism further including firing pin means for actuating said detonator means, and means actuated by said strain gage means for impelling said firing pin means against said detonator means to ignite said explosive charge when said predetermined maximum load is exceeded.

10. A mechanism according to claim 6, said load sensing means comprising electric strain gage means affixed to said operating element.

11. In a mechanism preventing application of excessive and unsafe loads to a power press and like machine having an operating element, drive means for said element, and a clutch releasably interconnecting said drive means and said element; a cylinder, a piston reciprocably movable within said cylinder, said piston being operatively connected to said clutch to actuate the latter for connecting said drive means to said element when said piston is in a first position and to deactuate said clutch for disconnecting said drive means from said element when said piston is in a second position, means communicating with said cylinder and including a reversing control valve interconnecting a source of fluid under pressure and said cylinder, said control valve being operable to selectively transfer fluid from said source to either side of said piston within said cylinder, whereby said piston may be reciprocated between said first and second positions, said cylinder being provided with a passageway for escape of fluid at one side of said piston, an exhaust valve located on said cylinder and normally closing said passageway, load responsive means on said press, means actuated by said load responsive means when said press is subjected to a load in excess of a predetermined maximum load for operating said reversing control valve so as to direct fluid into said cylinder in such a manner as to move said piston to said second position, and means actuated by said load responsive means when said press is subjected to a load in excess of a predetermined maximum load for opening said exhaust valve and thus said passageway to accelerate displacement of fluid from said cylinder at the advancing side of said piston as the latter moves toward said second position, whereby deactuation of said clutch occurs substantially without delay upon said press being subjected to excessive and unsafe loads.

12. In a mechanism according to claim 11, said load responsive means including stress sensing means affixed to said press and electric contact means actuated by said sensing means when said predetermined maximum load is exceeded, said contact means being operatively connected to said means for operating said control valve and to said means for opening said exhaust valve.

13. In a mechanism according to claim 11, said control valve normally transferring said fluid to said cylinder so as to retain said piston in said first position, and resilient means acting on said piston and tending to urge the latter toward said second position.

14. In a mechanism according to claim 12, said means for operating said control valve comprising electromagnet means energizable upon actuation of said contact means.

15. In a mechanism according to claim 12, said exhaust valve having a movable valve member normally seated in valve-closing position, said means for opening said exhaust valve including explosive means disposed adjacent said movable valve member, and means operated by said contact means upon actuation of the latter to explode said explosive means and impel said valve member to valve-opening position.

16. In a mechanism according to claim 15, said explosive means comprising a detonator cap, said means for exploding said explosive means comprising a firing pin projectable against said detonator cap.

17. In a mechanism according to claim 15, said means for exploding said explosive means comprising electric spark producing means energizable by said contact means upon actuation of the latter.

18. In a mechanism according to claim 15, releasable means disposed adjacent said movable valve member and operable to retain the latter in said valve-opening position subsequent to explosion of said explosive means.

19. In a mechanism according to claim 15, said exhaust valve being provided with an opening for escape of explosion gases, said opening being normally sealed from said explosive means and being opened upon movement of said valve member to said valve-opening position.

References Cited in the file of this patent
UNITED STATES PATENTS

| | | |
|---|---|---|
| 2,193,068 | Keck | Mar. 12, 1940 |
| 2,193,880 | Peet | Mar. 19, 1940 |
| 2,237,170 | Williamson | Apr. 1, 1941 |
| 2,405,439 | Lubbock et al. | Aug. 6, 1946 |
| 2,436,194 | Bush | Feb. 17, 1948 |
| 2,578,546 | Havener | Dec. 11, 1951 |
| 2,616,543 | Danly | Nov. 4, 1952 |
| 2,706,026 | Georgeff | Apr. 12, 1955 |
| 2,770,342 | Johansen | Nov. 13, 1956 |